United States Patent [19]

Stein et al.

[11] Patent Number: 5,462,421
[45] Date of Patent: Oct. 31, 1995

[54] METHOD AND MOLD FOR FORMING A SHAPED LAMINATE

[75] Inventors: Arthur C. Stein, Grosse Ile; John J. Reynolds, Howell, both of Mich.

[73] Assignee: General Motors Corporation, Detroit, Mich.

[21] Appl. No.: 192,881

[22] Filed: Feb. 7, 1994

[51] Int. Cl.⁶ ............................................ B29C 44/12
[52] U.S. Cl. ...................... 425/4 R; 425/127; 425/129.1; 425/292; 425/553; 425/585; 425/817 R; 425/DIG. 127
[58] Field of Search ............................. 425/501, 292, 425/129.1, 127, 4 R, 423, 817 R, DIG. 127, 592, 589, 585, 553; 264/163, 266

[56] References Cited

U.S. PATENT DOCUMENTS

| | | | |
|---|---|---|---|
| 2,270,186 | 1/1942 | Dulmage | 425/292 |
| 2,896,555 | 7/1959 | Marcus | 425/292 |
| 3,466,214 | 9/1969 | Polk et al. | 156/213 |
| 3,784,342 | 1/1974 | Merklinghaus | 425/292 |
| 4,071,598 | 1/1978 | Meadors | 264/295 |
| 4,243,456 | 1/1981 | Cesano | 156/214 |
| 4,327,049 | 4/1982 | Miller | 264/138 |
| 4,328,067 | 5/1982 | Cesano | 156/511 |
| 4,446,088 | 5/1984 | Daines | 264/155 |
| 4,555,376 | 11/1985 | Butler | 264/266 |
| 4,612,153 | 9/1986 | Mangla | 425/292 |
| 4,692,108 | 9/1987 | Cesano | 425/292 |
| 5,040,962 | 8/1991 | Waszeciak | 425/129.1 |

*Primary Examiner*—Jay H. Woo
*Assistant Examiner*—Vi Duong Dang
*Attorney, Agent, or Firm*—George A. Grove

[57] ABSTRACT

A method and mold apparatus are provided for forming and trimming a vehicle inner door panel. The panel is a shaped laminate including a vinyl cover layer and a structural foam backing layer having a glass fiber reinforcing substrate. Upper and lower mold members have peripheral seals which define a mold cavity when the mold is closed. A plurality of movable trim blades are carried by the lower mold member adjacent the seal. The trim blades move among retracted, intermediate and extended positions. Hydraulic rams open and close the mold and move the trim blades. Sheets of vinyl and substrate are placed across the lower mold member and the mold is closed to seal the substrate and vinyl layer about their periphery. As the mold closes, abutment surfaces on both mold members advance the trim blades to an intermediate position to pinch the cover layer against the substrate inwardly of the peripheral seals. A two-part polyurethane liquid foam system is injected into the cavity. The liquid permeates the substrate and sets up within the area delimited by the trim blades. When the foam sets up, the trim blades are hydraulically extended to sever the substrate and cover layer and trim the door panel to its finished shape as the foam fully cures. The mold members are opened, the blades are spring retracted, and the finished door panel is removed.

9 Claims, 6 Drawing Sheets

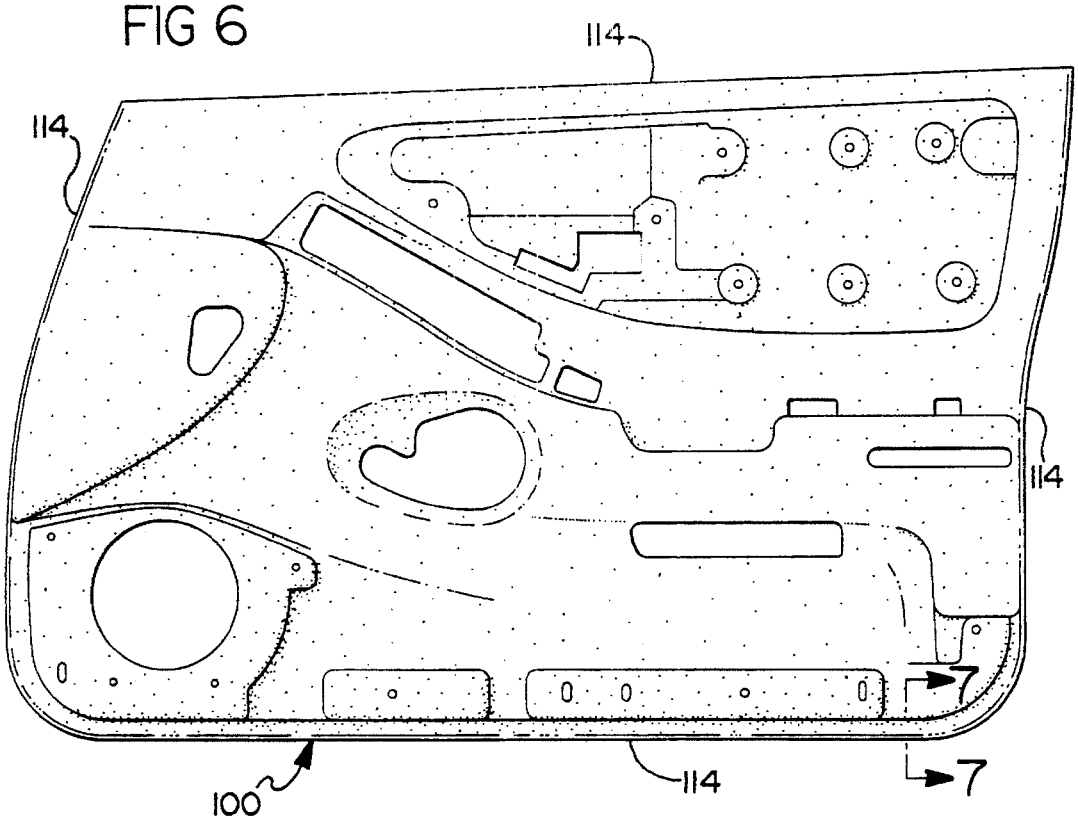
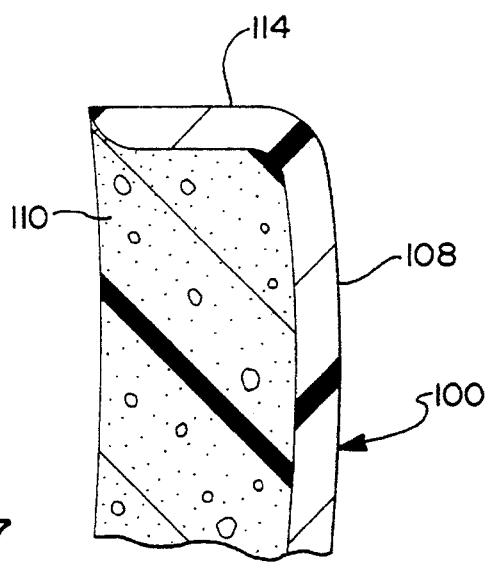

METHOD AND MOLD FOR FORMING A SHAPED LAMINATE

BACKGROUND OF THE INVENTION

This invention relates generally to shaped laminates and, more particularly, to a mold and a method for forming and trimming a shaped laminate for use as a vehicle inner door panel.

Current vehicle inner door panels comprise laminates of various types. In some, a structural backing material is covered by an embossed covering, which is often vinyl. These panels are formed by bonding the covering to the backing in a mold which embosses the covering. Sometimes a filler material, such as cellulose or a foam sheet, is bonded between the backing and covering. After bonding, the periphery of these panels must be trimmed before vehicle installation. This trimming is usually accomplished in a separate trim fixture.

The industry has developed a mold apparatus wherein the laminate is formed in a mold that also includes external trimming knives that provide a finished panel ready for vehicle installation. Such apparatus is shown in U.S. Pat. No. 4,692,108 to Cesano. All of the materials used in forming the Cesano type of laminated panel are preformed.

Another type of inner door panel in use comprises a laminate comprising a structural substrate of reinforced foam covered by a vinyl covering. This type of laminate is formed by placing the vinyl and reinforcing material in a mold and thereafter injecting foamable materials which expand, set up and cure in the mold. After curing, this unfinished laminate requires further processing before it is ready for vehicle installation. It is removed from the mold and transferred to a trim fixture, where it is finally trimmed by accurately cutting the periphery with a water jet or the like.

Some problems attend this post-formation trimming operation. The unfinished panel must be accurately positioned in the fixture; if not, the final panel will be out of dimension and unusable. Such a panel cannot be re-opped and must be scrapped. Also, this post-formation trimming operation requires additional handling, equipment and labor.

It would be desirable to provide apparatus for forming a laminated panel which produces a finished panel needing no further processing.

It would be further desirable to provide a mold for forming a laminated panel comprising a structural foam backing having a decorative covering material that is ready for installation upon removal from the mold.

SUMMARY OF THE INVENTION

It is, therefore, an object of this invention to provide apparatus for forming a laminated panel which produces a finished panel needing no further processing.

Another object of this invention is to provide a mold for forming a laminated panel comprising a structural foam backing having a decorative covering material that is ready for installation upon removal from the mold.

In one aspect, this invention features mold apparatus for forming a shaped laminate which comprises a cover layer and a foam backing layer formed in the apparatus and having a reinforcing substrate. The apparatus includes upper and lower mold members which open and close to define a mold cavity, peripheral seals carried by both of the mold members for sealing the cavity when the mold members are closed, and means for introducing foamable materials into the mold cavity. Trim blades are carried by one mold member inwardly of the cavity adjacent the seal and are movable among a retracted position adjacent the cavity, an intermediate position within the cavity adjacent the other mold member for confining the foamable materials, and an extended position engaging the other mold member to sever the vinyl and substrate to define the finished shape of the laminate. Power means open and close the mold members and move the trim blades among said positions.

In another aspect, this invention features a shaped laminate which comprises a cover layer and a foam backing layer having a reinforcing substrate that is formed and trimmed in a mold apparatus which includes a cavity and movable internal trim blades. The laminate is formed by placing sheets of cover material and substrate in the mold, closing the mold and moving the trim blades to pinch the vinyl layer and substrate against the upper mold member. Next, foamable materials are injected into the cavity to form the foam layer and press the cover layer against the trim blades to form a peripheral return flange. Later, the trim blades are further extended to sever the substrate and cover layer to trim the laminate to finished shape.

Preferably, the laminate is a vehicle inner door panel having vinyl cover material backed by polyurethane structural foam.

In yet another aspect, this invention features a method of forming and trimming a shaped laminate in a mold. The laminate comprises a vinyl cover layer and a structural foam backing layer having a glass fiber reinforcing substrate. The method comprises the steps of (a) providing a mold including upper and lower members having peripheral seals which define a cavity, trim blades movable among a plurality of positions, injection means, and power means for opening and closing the mold members and for moving the trim blades, (b) placing sheets of vinyl and substrate across the lower mold member, (c) closing the mold members to sealingly engage the substrate and vinyl layer about the peripheral seals, (d) extending the trim blades to an intermediate position pinching the vinyl layer and substrate against the upper mold member inwardly of the peripheral seal, (e) injecting foamable materials into the cavity to expand and form the foam layer, (f) curing the foam layer, (g) further extending the trim blades to sever the substrate and cover layer to trim the shaped laminate to finished shape, (h) retracting the trim blades after the foam layer has set up, (i) opening the mold members, and (j) removing the finished shaped laminate from the mold.

Preferably, the foamable materials comprise a two-part polyurethane foaming system, and the extension of the trim blades to intermediate position and subsequent expansion of the foam forms a peripheral return flange on the finished laminate.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 6 is a side view of a vehicle door panel produced by the mold of FIGS. 1 through 5, according to this invention; and FIG. 7 is an enlarged partial sectional view of the edge of the door panel, taken along line 7—7 of FIG. 6.

DESCRIPTION OF THE PREFERRED EMBODIMENT

Figure 1:
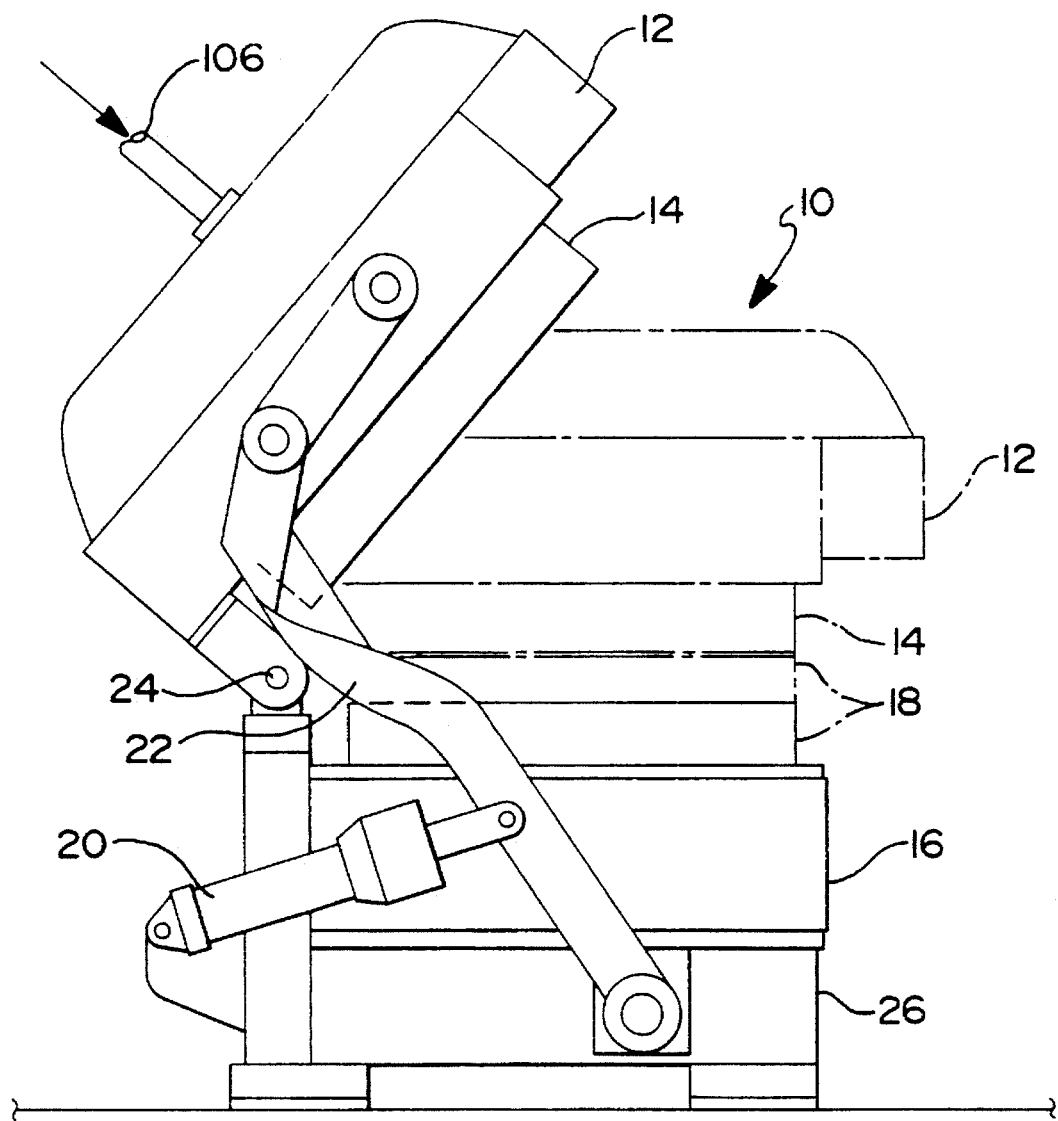
FIG. 1 is a side view of a press incorporating a mold according to this invention.

FIG. 1 schematically shows a press 10 having an upper part 12, which mounts an upper mold member 14, and a lower part 16, which mounts a lower mold member 18. A double-acting hydraulic cylinder 20 operates a toggle linkage 22 to move upper press part 12 and mold member 14 about pivot 24 between open (solid line) and closed (phantom line) positions. Lower press part 16 and mold member 18 are reciprocated between open (solid line) and closed (phantom line) positions by hydraulic cylinders (not shown) mounted in the four corners of the framework 26 of press 10.

Figure 2:
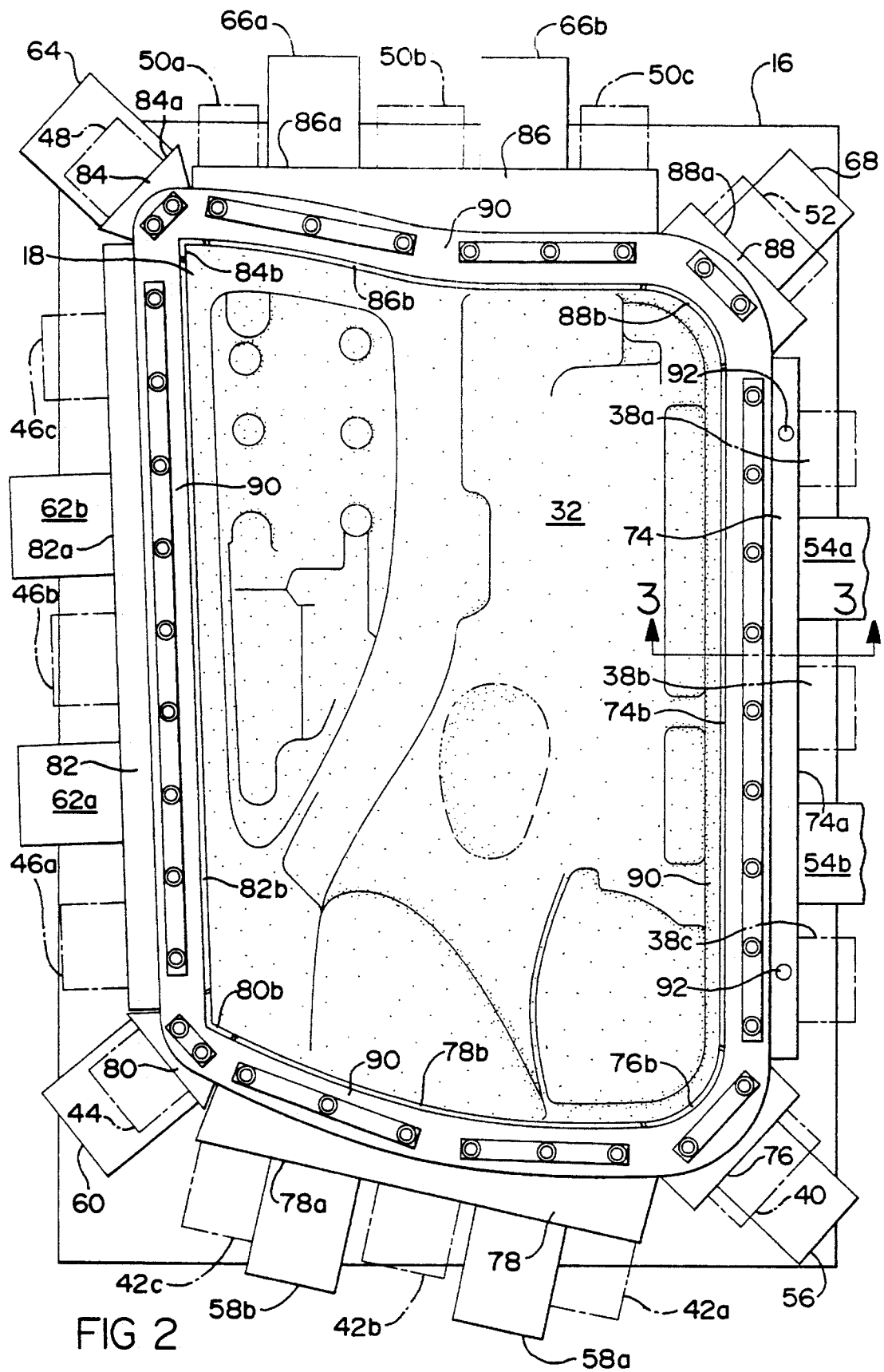
FIG. 2 is a plan view of a lower mold member of the mold of FIG. 1.
Figure 3:
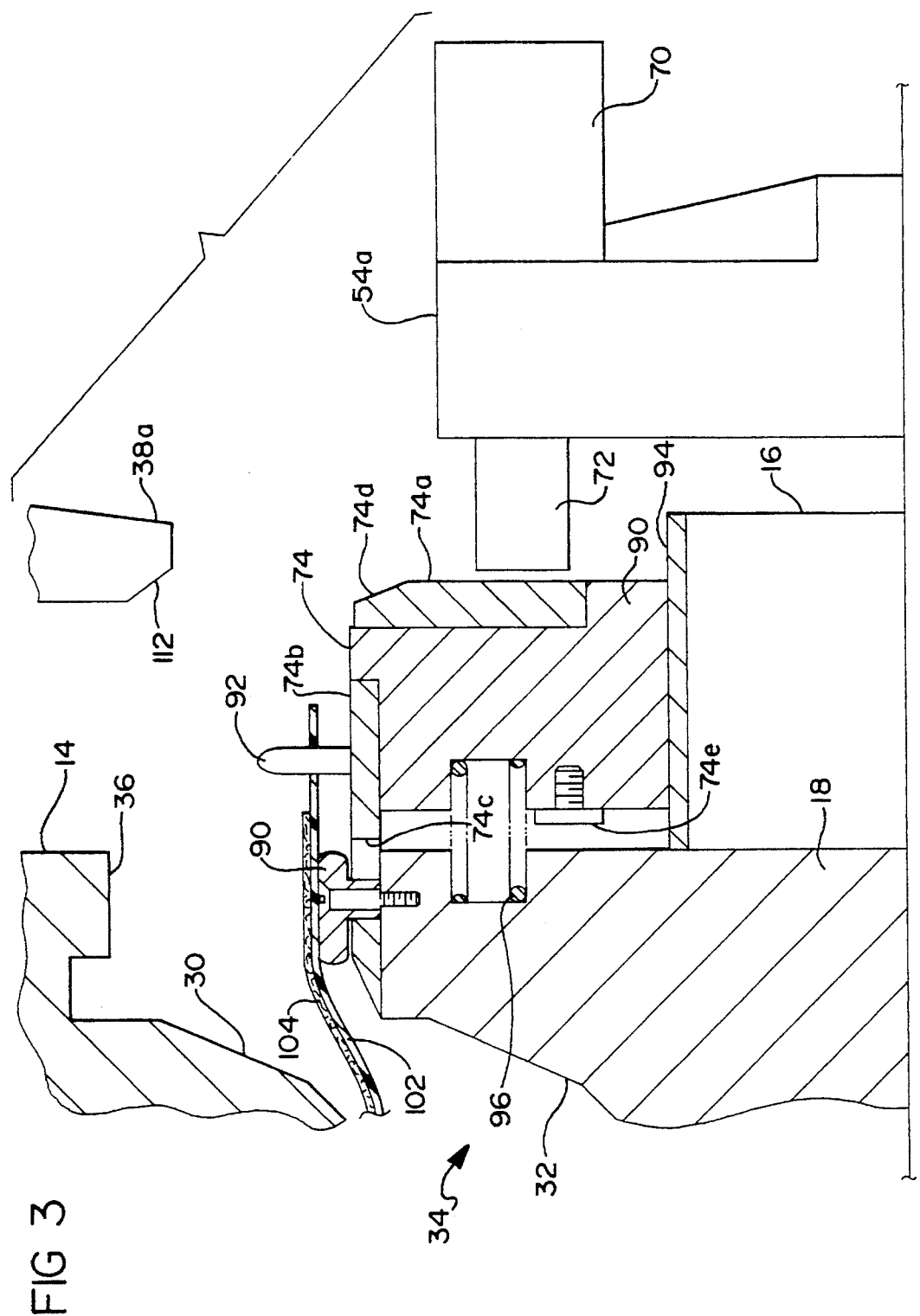
FIG. 3 is an enlarged partial sectional view, taken along line 3—3 of FIG. 2, with the mold illustrated prior to closure and foam injection.

Referring now to FIGS. 2 and 3, upper and lower mold parts 14 and 18 include respective contoured inner surfaces 30 and 32 which define a mold cavity 34 when closed. Upper mold part 14 includes a depending peripheral sealing ring 36 and spaced drivers 38a, 38b, 38c, 40, 42a, 42b, 42c, 44, 46a, 46b, 46c, 48, 50a, 50b, 50c and 52.

Lower mold part 18 includes a plurality of spaced hydraulic units 54a, 56b, 56, 58a, 58b, 60, 62a, 62b, 64, 66a, 66b and 68, each including a cylinder 70 and ram 72. Slides 74, 76, 78, 80, 82, 84, 86 and 88 are interposed between respective hydraulic units 54a, 56b, 56, 58a, 58b, 60, 62a, 62b, 64, 66a, 66b and 68 and the outer surface of lower mold part 18.

Figure 5:
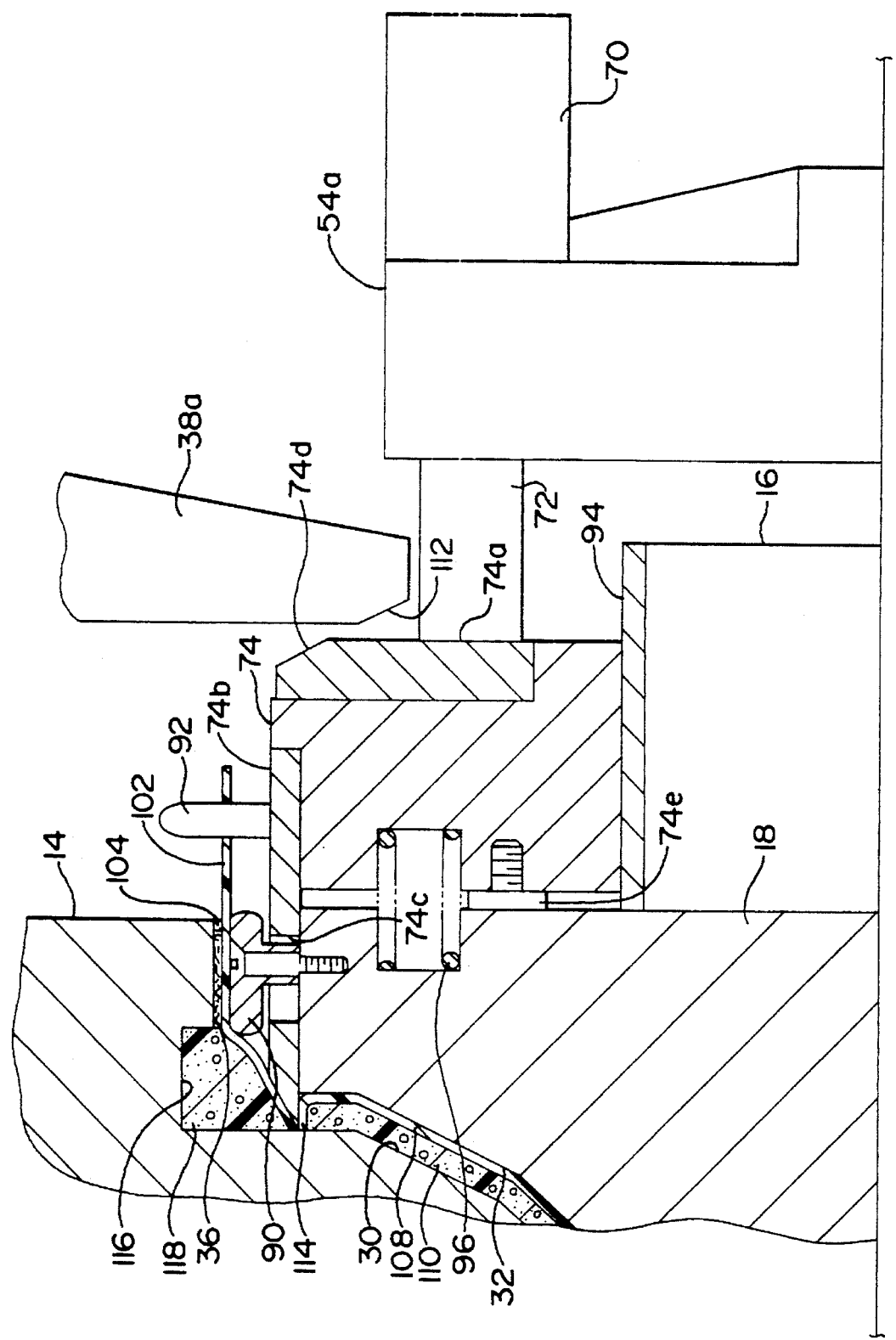
FIG. 5 is a view similar to FIG. 3, illustrating the mold after the foam has set up and the door panel has been trimmed in mold.

As can be seen from FIG. 3, all slides are of different dimension; however, they are all similarly configured and mounted. Thus, only slide 74 will be described in detail, since it is representative. Slide 74 mounts an abutment plate 74a and a trim blade 74b having a slot 74c that receives the mounting post of a peripheral sealing ring 90 which is secured to lower mold part 18. Slide 74 includes a cam surface 74d on abutment plate 74a and a spacer 74e and mounts pins 92. Slide 74 is mounted for sliding movement on a track 94 on die lower part 16 between its retracted FIG. 3 position, determined by biasing compression springs 96, and its extended FIG. 5 position, as determined by spacer 74e. Slides 76, 78, 80, 82, 84, 86 and 88 are similarly provided with trim blades 76b, 78b, 80b, 82b, 84b, 86b and 88b and are mounted for sliding movement on tracks 94 on lower die part 16.

Upper and lower mold parts 14 and 18 close to form a mold having cavity 24 for forming a shaped laminate. The shaped laminate formed is an automobile inner door panel 100 illustrated in FIGS. 6 and 7. Panel 100 is preferably formed from a sheet of vinyl 102, a liquid-permeable glass fiber reinforcing substrate or mat 104, and a two-pan reactive polyurethane system which is injected as a liquid into mold cavity 34 through an injector 106 in upper press part 12 (FIG. 1). When formed by the apparatus described above according to the method described below, door panel 100 will emerge from the mold in press 10 as illustrated in FIG. 6, ready for installation in an automobile without further processing. As molded, panel 100 will comprise a vinyl skin 108 having a structural foam backing 110. The glass fiber substrate is submerged in foam backing 110.

The processing sequence is as follows. The vinyl sheet 102 is stretched across lower mold member 18 and hooked over pins 92, as shown in FIG. 3. Next, the glass fiber sheet 104 is placed atop the vinyl sheet. Cylinders 20 and the cylinders in the four corners of press framework 26 are actuated to move press 10 from the solid line to the phantom line positions of FIG. 1. This moves mold members 14 and 18 from the FIG. 3 position to the FIG. 4 position.

As upper mold member 14 closes on lower mold member 18, spaced drivers 38a, 38b, 38c, 40, 42a, 42b, 42c, 44, 46a, 46b, 46c, 48, 50a, 50b, 50c and 52 descend to engage the cam surfaces of slides 74, 76, 78, 80, 82, 84, 86 and 88 to drive all slides inwardly of lower mold member 18. This is typified in FIG. 4, which shows the cam surface 112 of driver 38a sliding past cam surface 74a to move slide 74 against the bias of spring 96 from the retracted FIG. 3 position to the intermediate FIG. 4 position. This slide movement advances trim blade 74b to pinch vinyl sheet 102 and glass fiber mat 104 against upper mold inner surface 30, forming a return flange 114 of vinyl. Slot 74c in trim blade 74c enables the trim blade to move relative to seal ring 90. Similarly, all trim blades 74b, 76b, 78b, 80b, 82b, 84b, 86b and 88b are moved to this intermediate pinching position.

Figure 4:
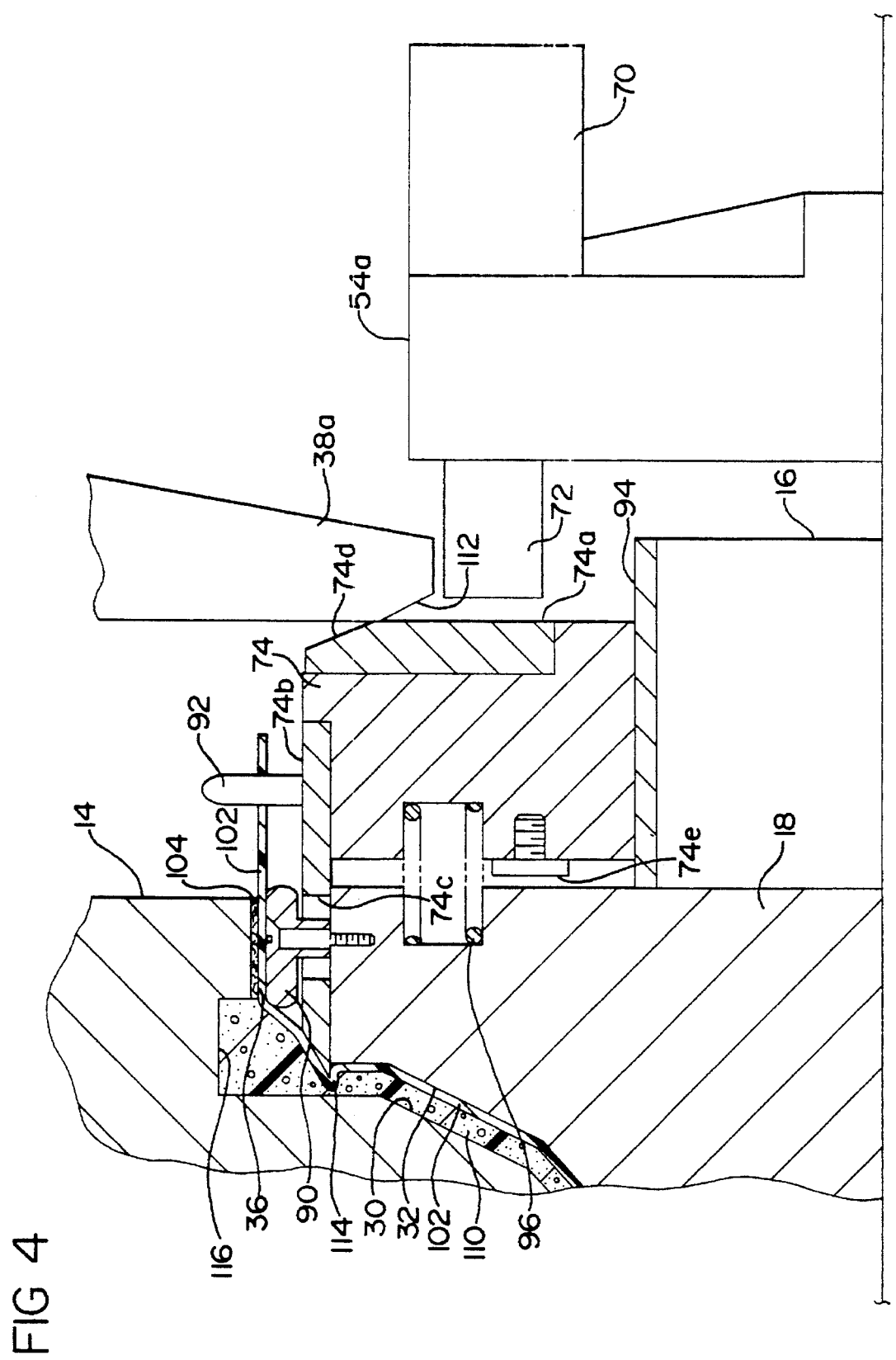
FIG. 4 is a view similar to FIG. 3, illustrating the mold after closure and foam injection.

In the mold closed position of FIG. 4, upper sealing ring 36 engages lower seal ring 90 to seal the mold. At this time, the two-part reactive polyurethane system is injected as a liquid into mold cavity 34 through an injector 106. The liquids permeate glass fiber mat 104 which submerges in the foam layer 110 which results from reaction of the polyurethane system liquids. Any liquid which seeps past the pinched return flange 114 will be captured in a peripheral chamber 116 formed in upper mold member 14.

After the foam has set up, hydraulic units 54a, 56b, 56, 58a, 58b, 60, 62a, 62b, 64, 66a, 66b and 68 are actuated to extend their rams into engagement with slide abutment surfaces 74a, 76a, 78a, 80a, 82a, 84a, 86a and 88a to move the slides and trim blades further inwardly of mold member 18. This is typified in FIG. 5, which shows ram 72 extending to move slide 74 to a fully extended position in which spacer 74e engages the side of mold member 18. In this position, trim blade 74b has been moved into engagement with upper mold inner surface 30, cutting through vinyl layer 102 and glass fiber mat 104. This finish trims panel 100 in the mold as it is being molded and produces a peripheral finished return flange 114.

After foam layer 110 has fully cured, the press hydraulic cylinders are actuated to move press 10 to its open solid line position of FIG. 1, opening the mold. Simultaneously, hydraulic units 54a, 56b, 56, 58a, 58b, 60, 62a, 62b, 64, 66a, 66b and 68 are actuated to retract their rams, enabling springs 96 to retract slides 74, 76, 78, 80, 82, 84, 86 and 88 to the position typified in FIG. 3. Panel 100 and waste materials 118 in chamber 116 are then stripped from the mold.

As previously noted, panel 100 is ready for installation without further processing. This is possible because the panel has been finish trimmed in the mold by trim blades which operate inwardly of the mold cavity to form a peripheral return flange during the molding process.

While only a preferred embodiment of an article, apparatus and method has been illustrated and described, obvious modifications thereof are contemplated within the scope of this invention and the following claims.

The embodiments of the invention in which an exclusive property or privilege is claimed are defined as follows:

1. Mold apparatus for forming a shaped laminate which comprises a cover layer and a foam backing layer formed in the apparatus and having a reinforcing substrate, said apparatus comprising upper and lower mold members which open and close to define a mold cavity, peripheral seals carried by both of the mold members for sealing the cavity when the mold members are closed, means mounted on the mold for introducing foamable materials into the mold cavity, trim blades carried by one mold member inwardly of the cavity adjacent the seal, the trim blades being sequentially movable from a retracted position adjacent the cavity, to an intermediate position within the cavity adjacent the other mold member for confining the foamable materials, to an extended position engaging the other mold member to sever the cover layer and substrate to define the finished shape of the laminate, and back to the retracted position, and power means for opening and closing the mold members and for moving the trim blades through said sequence of positions.

2. The mold apparatus of claim 1, wherein at least four trim blades are carried by the lower mold member.

3. The mold apparatus of claim 2, wherein the power means comprise a hydraulic cylinder for opening and closing the mold members and hydraulic cylinders for moving the trim blades.

4. The mold apparatus of claim 3, wherein the upper and lower mold members include respectively a plurality of first and second abutment surfaces which coact upon mold closure to moving the trim blades to an intermediate position, the hydraulic cylinders operating to move the trim blades to an extended position.

5. The mold apparatus of claim 4 including biasing means associated with each trim blade which are stressed during movement of the trim blades to intermediate and extended position and are operable to return the trim blades to retracted position upon mold opening.

6. The mold apparatus of claim 5, wherein each trim blade is mounted on a holder slidable on the lower mold member, the first abutment surfaces are carried by the holders, and the second abutment surfaces are carried by a driver associated with each holder for interengagement of the abutment surfaces to move the blades upon mold closure.

7. The mold apparatus of claim 6, wherein the first and second abutment surfaces are cam surfaces.

8. The mold apparatus of claim 7, wherein the biasing means are compression springs.

9. The mold apparatus of claim 2, wherein the trim blades include means which, in intermediate position, limit peripheral movement of the cover layer during foam expansion and form a return flange about the periphery of the shaped laminate.

* * * * *